May 26, 1964
L. W. NIEDRACH
3,134,697
FUEL CELL
Filed Nov. 3, 1959
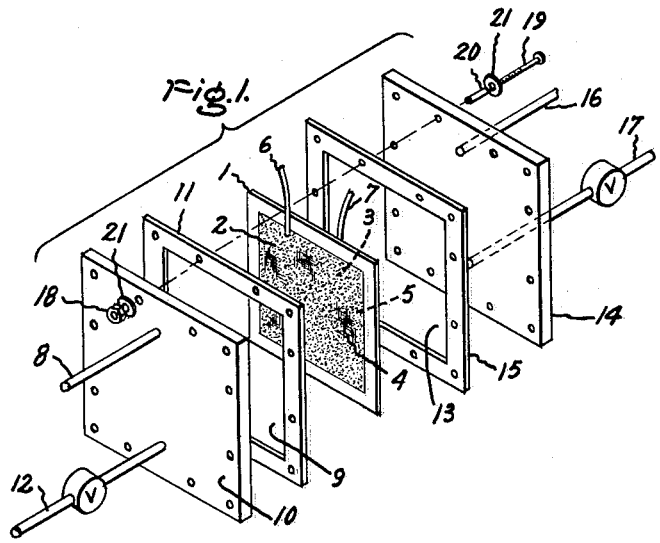
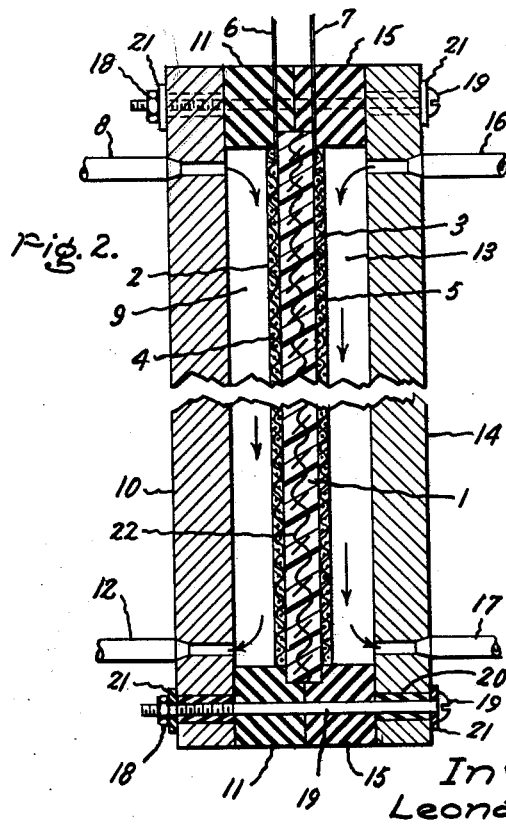
Inventor:
Leonard W. Niedrach,
by James W. ...........
His Agent.

United States Patent Office 3,134,697
Patented May 26, 1964

3,134,697
FUEL CELL
Leonard W. Niedrach, Schenectady, N.Y., assignor to General Electric Company, a corporation of New York
Filed Nov. 3, 1959, Ser. No. 850,589
46 Claims. (Cl. 136—86)

This invention relates to gaseous fuel cells. More particularly, this invention relates to improved gaseous fuel cells in which the electrolyte comprises a membrane formed from an ion exchange resin. Most of the presently known fuel cells are not completely satisfactory in that they require high pressures and high temperatures for their operation and they have relatively low volume efficiencies. Volume efficiency is the amount of electrical power which can be obtained from a unit volume of a fuel cell.

In a copending application of Willard T. Grubb, Serial No. 518,749, filed June 29, 1955, now U.S. Patent 2,913,511, issued November 17, 1959, and assigned to the same assignee as the present invention, there is disclosed and claimed a novel fuel cell comprising an ion exchange membrane as an electrolyte in contact with metallic electrodes which not only are conductors of electricity, but also adsorb the gaseous fuel and act as a catalyst for the electrode reaction. I have found that when the fuel cells disclosed and claimed in the above-identified application are constructed in a particular way that the polarization of the cell is decreased substantially. By polarization I mean that effect which is readily noted by the decrease in the voltage as the amount of current applied by the cell increases. This is a normal characteristic of all cells and can never be entirely eliminated. However, any reduction of the polarization of a cell is a much sought after and desirable accomplishment, since it permits a given cell to provide a greater amount of current at a given voltage thereby increasing the maximum power capability of the cell.

An object of the present invention is to provide a combination electrode and electrolyte structure for an ion exchange resin membrane fuel cell.

A further object of this invention is to provide a fuel cell having a high volume efficiency, high power capability, and low polarization incorporating a combination electrode and electrolyte structure.

These and other objects of my invention are accomplished by providing a fuel cell comprising means for supplying a gaseous fuel to one of the electrodes, means for providing a supply of oxidant gas to the other electrode, and an ion exchange resin membrane having the electrodes comprising at least one gas adsorbing metal embedded in the two major surface layers of the membrane so that the electrodes form an integral part of the membrane surface.

My invention may be better understood by reference to the following description taken in connection with the drawing in which FIG. 1 is an exploded view of a fuel cell within the scope of the present invention; and FIG. 2 is an enlarged cross-sectional view of the assembled fuel cell shown in FIG. 1 to show structural detail.

An ion exchange resin membrane is an outstanding eelctrolyte for use in fuel cells since the electronic conduction of the membrane is negligible, electrolytic conductance of the membrane can be made high, the membranes are permeable to one kind of ion while resisting the passage of uncharged gases, the membranes are self-supporting and can be reinforced to produce membranes having high mechanical strength and the membranes can be prepared as thin sheets of large area which are necessary for favorable cell geometry. The cells produced with these membranes are operable at room temperature and atmospheric pressure while having a high volume efficiency, high power capability, and low polarization. If desired, the cells may be operated above or below ambient atmospheric conditions of temperature and pressure within the limits of the freezing and boiling point of the aqueous medium present within the ion exchange membrane. To avoid rupture of the membrane, the pressure of the fuel and oxidant gas in contact with the membrane should preferably be equal but in no case should the pressure difference exceed the ability of the membrane to withstand the force.

The ion exchange resin membranes employed in the present invention are ion exchange resins in sheet form. These resins include in their polymeric structure ionizable radicals, one ionic component of which is fixed or retained by the polymeric matrix with at least one ion component being a mobile, replaceable ion electrostatically associated with the fixed component. The ability of the mobile ion to be replaced under appropriate conditions by other ions, imparts ion exchange characteristics to these materials.

As is well known, ion exchange resins can be prepared by polymerizing a mixture of ingredients, one of which contains an ionic substituent. In the case of cation exchange resins, these ionic groups are acidic groups such as the sulfonic acid group, the carboxyl group, and the like. In the case of anion exchange resins, the ionic group is basic in nature and may comprise amine groups, quaternary ammonium hydroxides, the guanidine group, the dicyandiamidine group, and other nitrogen-containing basic groups. In the case of these ion exchange resins, the ionizable group is attached to a polymeric compound such as a phenol-formaldehyde resin, a polystyrene-divinyl-benzene copolymer, a urea-formaldehyde resin, a melamine-formaldehyde resin, a polyalkylene-polyamine-formaldehyde resin, etc. Thus, a typical cation exchange resin may be prepared by polymerizing the reaction product of m-phenolsulfonic acid with formaldehyde. A typical anion exchange resin may be prepared by polymerizing the reaction product of phenol, formaldehyde and triethylenetetramine. The preparation and properties of a number of different types of ion exchange resins are described throughout the literature and in particular in "Ion Exchange," Nachod, Academic Press, Inc., New York (1950); "Ion Exchange Resins," Kunin and Myers, John Wiley & Sons, Inc., New York (1950); "Styrene, Its Polymers and Copolymers and Derivatives," Boundy and Boyer, Reinhold, New York (1950); and in U.S. patents such as 2,366,007—D'Alelio; 2,366,008—D'Alelio; 2,663,702—Kropa; 2,664,397—Hutchinson; 2,678,306—Ferris; 2,658,042—Johnson; 2,681,319—Bodamer; 2,681,320—Bodamer.

The formation of these ion exchange resins into membrane or sheet form is also well known in the art. In general, these membranes are of two forms, the mosaic or heterogeneous type in which granules of ion exchange resin are incorporated into a sheet-like matrix of a suitable binder, for example, a binder of polyethylene or polyvinyl chloride, and the continuous or homogeneous ion exchange resin membrane in which the entire membrane structure has ion exchange characteristics. The latter type of membrane may be formed by molding or casting a partially polymerized ion exchange resin into sheet form. The formation of these ion exchange membranes is described, for example, in "Amberplex Ion Permeable Membranes," Rohm and Haas Co., Philadelphia (1952), and in the references mentioned in this publication. In addition, the preparation of a plurality of different types of ion exchange membranes is described in Patent 2,636,851—Juda et al. and 2,702,272—Kasper.

As a general rule, ion exchange resins are formed in aqueous solutions or emulsions of various types of organic compounds so that when the membrane is formed it is substantially saturated with water. Thus, a phenol sulfonic acid-formaldehyde resin is found to contain a plurality of reactive sites consisting of —$SO_3H$ radicals attached to the resin matrix with sufficient water being held in the resin matrix by Van der Waals force so that the $H^+$ ion is extremely mobile in the resin matrix. In this form the resin is described as being hydrated. The term "hydrated" means that the resin contains enough water to substantally saturate the resin but the resin is not necessarily wet. The amount of water in a hydrated ion exchange resin may vary within wide limits depending on the particular composition of the resin and its physical structure. Generally, the hydrated resins employed in the present invention contain from about 15 to 50 percent, by weight, of water held in the resin by secondary Van der Waals forces. This water of hydration cannot be removed from the resin by mechanical forces, but can be removed from the resinous material by subjecting the resin to a vacuum of several microns.

The thickness of the membranes employed in the practice of the present invention is not critical and may vary from several mils up to a quarter of an inch or more. However, for economic reasons, and to increase the volume efficiency of the cell, the membranes are preferably as thin as possible, such as, for example, from about 2 to 30 mils. Since the membrane is a physical barrier separating the fuel gas from the oxidizing gas, it is necessary that the membrane be free of defects and structurally strong enough to prevent the two gases from intermixing.

Although a number of different types of electrode structures are suitable for use in the cells of the present invention, each electrode should be one which is an electronic conductor, which will adsorb the fuel employed and which will act as a catalyst for the electrode reaction. Suitable gas adsorbing metals are well known and many are described for example, in "Catalysis, Inorganic and Organic," Berkman, Morrel and Egloff, Reinhold Publishing Co., New York (1940); "Catalytic Chemistry," H. W. Lohse, Chemical Publishing Co., Inc., N.Y. (1945); etc. Suitable materials include the noble metals of group VIII series of metals of the periodic table of elements, which are rhodium, ruthenium, palladium, osmium, iridium, and platinum. Other suitable metals include the other metals of group VIII, e.g., nickel, iron, cobalt, etc., as well as other metals known to catalytically adsorb gases, e.g., silver, copper, and metals of the transition series, e.g., manganese, vanadium, rhenium, etc. In addition to electrodes formed of these metals, the electrodes can be formed of platinum or palladium black which has been deposited on a base metal such as stainless steel, iron, nickel and the like. In addition, suitable electrodes may be formed from metal oxides and carbon which have been activated with platinum or palladium, or from carbon which has been activated with oxides of iron, magnesium, cobalt, copper, etc.

Since the adsorption of gases on solids is a surface phenomenon, it is desirable that the electrodes be of the maximum practicable surface area and that the surface preferably be in its most active state for the adsorption of gases. Also, for maximum cell efficiency each electrode should cover, as uniformly as possible, the entire effective major surface of the membrane of which it is an integral part. The effective area is that area which is in contact with the fuel gas. For these reasons, I prefer to use finely divided metal powders, having highly developed surface areas, for example, at least 10 square meters per gram and preferably at least 100 meters per gram, since they will have greater surface area per unit or mass than metal screens or foils, and can be distributed uniformly over the major surface of the membrane. Extremely fine mesh metal screens, for example 150 mesh or finer, will, for all practical purposes give a uniform coverage of the membrane especially if the wires are rolled flat, for example, by passing the screen through a set of pressure rolls but will not give as great an effective surface area per unit of mass as an electrode made of metal powder. However, wire screen may be coated with finely divided metal powders by well known techniques, for example, by platinizing or palladinizing the screen, but such metal screens do not provide as active an electrode as is obtained with metal powders. For maximum cell performance, I prefer to make the electrodes by using the very active metal powders of the group VIII metals, for example, platinum black, palladium black, Raney nickel, etc. The noble metals of the group VIII series of metals have a further advantage in that when the membrane is made from a cation exchange resin acidic corrosion conditions exist at both the anode and cathode which shorten the life of cells having electrodes made of materials such as nickel, iron, copper, etc. This effect does not occur in cells having electrodes made from the noble metals of group VIII metals. The corrosive effect is not as pronounced in fuel cells using an anion exchange membrane because the conditions are now basic rather than acidic. Long cell life may be obtained by using any metals which are resistant to bases, for example, the group VIII metals, including nickel, cobalt, etc., as well as the other known gas adsorbing metals, e.g., rhenium, in cells having an anion exchange resin membrane. Choice between these materials is governed by design considerations such as intended use, desired, life, gases used for fuel and oxidant, etc.

Many ways are available for incorporating the catalytically active electrodes into the two major surfaces of the ion exchange resin membrane. For example, the resin may be calendered, pressed, cast or otherwise formed into a sheet. Alternatively, a fibrous cloth or mat, preferably of fibers that are resistant to the highly acidic or basic ion exchange resin, for example, glass, asbestos, acrylonitrile, vinylidene chloride, polytetrafluoroethylene, etc. fibers may be impregnated and surface coated with the ion exchange resins by mixing, dipping, calendering, doctor blading or other known coating techniques suitable for the characteristics of the particular resin being used to give a fibrous reinforced resin sheet. If the resin used was in the partially polymerized or cured state, it may be further polymerized or cured after forming into a sheet, either to a further advanced state of polymerization or to a fully polymerized state.

If the resin in the resin sheet is only partially polymerized or is of the heterogeneous type, where a completely polymerized resin is in a matrix of a thermoplastic resin, an electrode may be pressed into and bonded to each of the major surfaces of the sheet by use of pressure preferably at elevated temperatures to cause further polymerization of the partially polymerized resin or flow of the thermoplastic resin. If the electrode is to be made of metal powder the powder may be distributed on the surface of the resin by any well known technique such as sprinkling, spraying, sifting, electrostatically coating, etc. To aid in bonding, the electrode material may be premixed or coated with some of the ion exchange resin in the form of a solution, liquid suspension or, if the resin contains a thermoplastic binder or is only partially polymerized, solid granules of the resin. This bonding technique is required if the ion exchange membrane is of the homogeneous, fully polymerized type. The electrode material may be spread on the surface of the ion exchange membrane or on the press platens used to press the electrode material into the surface of the ion exchange membrane. Preferably, the electrode is formed on each major surface before further fabrication. However, it is possible to fabricate one electrode layer on the membrane at a time.

The assembly of the ion exchange membrane and electrode or electrodes is placed between platens and subjected to sufficient pressure preferably at an elevated temperature sufficient to cause the resin in either the membrane or in admixture with the electrode material to either complete the polymerization if the resin is only partially polymerized or to flow if the resin contains a thermoplastic binder.

If the ion exchange resin membrane is capable of flowing under heat and pressure, it will be necessary to regulate the pressing conditions so that the electrode material on one surface is not pressed so deeply into the membrane that the two electrodes make contact with each other. In this respect the use of a fibrous or fabric filler in the ion exchange resin proves desirable since it acts as a limiting spacer to prevent the two electrode surfaces from being pressed into contact with each other. However, well known pressing techniques using external shims, forms, molds, etc., can also be used to limit the flow of the resin and, if desired, to produce membrane-electrode assemblies having a specific thickness and shape. It is to be kept in mind that the main objective is to produce an ion exchange membrane core free of any electrode material but having on each of its major surfaces a layer of gas adsorbing metal integrally bonded to the core to form a unitary mass.

When the electrode material is the preferred metal powders, the electrical conductivity of the electrode is somewhat limiting and increases the internal resistance within the cell. This can be reduced by constructing the fuel cell so that there is a sufficient number of points of contact over the electrode area with a current collecting terminal made of a good electrical conductor. These current collecting terminals may be suitably provided by use of a screen, metal wires, metal bars, punched or expanded metal plates, etc., which do not prevent the fuel gas from contacting the electrode area, and are electrically connected to the appropriate electrical lead. In this application, the current collecting terminal structure will be referred to as a terminal grid. These terminal grids may be either in contact with only the surface of the electrode or they may be incorporated into and form an integral part of the electrode surface on the ion exchange membrane core. If the terminal grid is on the surface of the electrode, it should be so fabricated that any liquid products of the cell reaction, e.g., water from a hydrogen-oxygen cell, may readily drain from the electrode surface. It will be readily apparent that when the terminal grid is only in surface contact with the electrode that such a grid may have an electrode surface from a second membrane in contact with the opposite major surface of the terminal grid in a battery arrangement where more than one cell is connected together. In such an arrangement, the two electrodes which are in contact with the same terminal grid will have the same electrical charge, since they will be in contact with the same gas, i.e., either the fuel or oxidant gas. Such an arrangement joins the two cells in parallel. A novel modification in the construction of the battery permitting a bipolar electrode and series connection of the cells is disclosed and claimed in a copending application Serial Number 850,588, Douglas and Cairns, filed concurrently herewith and assigned to the same assignee as the present invention.

For a more complete understanding of the gaseous fuel cells of the present invention, reference is made to the drawing in which:

FIG. 1 is an exploded schematic drawing of a fuel cell illustrative of the present invention, and FIG. 2 is an enlarged vertical cross-sectional view of the cell shown in FIG. 1. This cell comprises an ion permeable membrane 1 as the sole electrolyte having electrodes 2 and 3 and terminal grids 4 and 5 embedded in and integrally bonded to each of its major surfaces. Leads 6 and 7 connected to terminal grids 4 and 5, respectively, are used to deliver electrical current to the apparatus being operated by the cell. Fuel gas is supplied to electrode 2 through inlet 8 and chamber 9 formed by end plate 10, gasket 11 and electrode 2 on the surface of membrane 1. A valved outlet 12 is provided from chamber 9 to exhaust any impurities which enter the chamber 9 with the fuel gas or any materials which are a product of reaction of the fuel gas. The oxidant gas which may be oxygen or air is admitted into chamber 13 formed by end plate 14, gasket 15 and electrode 3 on the surface of membrane 1 through inlet 16. Chamber 13 contains a valved outlet 17 for the withdrawal of impurities in the oxidant gas. Thus, where the oxidant is air, outlet 17 is employed to remove the non-reactant nitrogen which builds up in chamber 13. The end plates, gaskets, and membrane are held in gas-tight relationship with each other by means of a plurality of nuts 18, insulating washers 21, and bolts 19 which have insulating sleeves 20 which concentrically fit into the holes around the periphery of the end plates 10 and 14, and gaskets 11 and 15. Other alternative means of clamping these elements together are readily apparent to those skilled in the art. End plates 10 and 14 can be made of any material which has structural strength and can resist the corrosion conditions encountered by the cell. The end plates 10 and 14 may be made of metal but are preferably made from an insulating material, e.g., polystyrene, polymethyl methacrylate, vulcanized fiber, fibrous or fabric, based phenolic, urea, or melamine laminates, hard rubber, etc. In such a case insulating sleeves 20 and insulating washers 21 may be omitted. Gaskets 11 and 15 may be made from any resilient rubbery type of polymer, but preferably one which is not affected by the feed gases or their reaction products with which it comes in contact. Suitable materials would be, for example, the synthetic rubbery elastomers such as silicone rubber, rubbery copolymers of fluorinated ethylene, synthetic rubbery copolymers of butadiene with styrene, acrylonitrile, isoprene, butene, chloroprene, or the homopolymers of chloroprene, etc. The insulating sleeves 20 and insulating washers 21 may be fabricated from any of the known insulators, such as those used for making the end plates 10 and 14.

FIG. 2 shows a vertical cross-sectional view of the cell of FIG. 1 in the plane of gas inlets 8 and 16 and outlets 12 and 17, in order to illustrate one embodiment of my invention wherein the terminal grids are an integral part of the electrode. In FIG. 2, membrane 1 has been fabricated with a fabric reinforcement 22 which can be any non-conductive material resistant to the chemical conditions existing in the membrane, for example, Orlon cloth, nylon cloth, glass cloth, fibrous mats of Orlon, nylon, glass, etc. It serves to strengthen the membrane 1 and can also serve a useful function during fabrication as pointed out previously. Terminal grids 4 and 5, illustrated as being made from metal wire screen, are an integral part of electrodes 2 and 3 which are illustrated as being fabricated from a metal powder incorporated in an ion exchange resin. In this structure, the electrodes and terminal grids are embedded in and integrally bonded to the major surfaces of the ion exchange membrane with its fabric reinforcement and all are united into a unitary mass.

In the cell of FIGS. 1 and 2, where the membrane 1 is a cation permeable membrane, having H+ ions as the mobile ion, where the fuel gas is hydrogen and the oxidant is air, the overall cell reaction is the oxidation of hydrogen to water. The respective reactions at the anode 2 and cathode 3 are as follows:

(1) $H_2 = 2H^+ + 2e$
(2) $\frac{1}{2}O_2 + 2H^+ + 2e = H_2O$

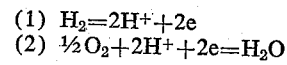

Where hydrogen is used as a fuel gas it is noted that the product of the overall cell reaction is water. It is not known whether this water forms at the oxygen electrode or in the cation permeable membrane. However, since the membrane is substantially saturated with water prior to the operation of the cell, the product water is rejected at the oxygen electrode on the membrane from which it escapes by simple flow or by evaporation. However, means may be provided, if desired, for collecting the water as it is formed and carrying it away from the cell. Thus, the water formed may be allowed to flow from the membrane into a collection trough or the membrane may be subjected to a current of air or other gas to sweep the water away from the membrane as it is formed. Where the oxidant employed in the cell is air, the nitrogen of the air does not enter into the cell reaction and begins to accumulate in chamber 13. For this reason, it is desirable to bleed off a portion of the gases from chamber 13 through valved outlet 17 so as to maintain the concentration of oxygen in chamber 13 at a level somewhat near the level found in air, i.e., about 20 percent by volume.

When the cell just described employs an anion permeable resin membrane with hydrogen and oxygen, the overall reaction is again the oxidation of hydrogen to water with the electrode reactions being:

(3) $H_2 + 2OH^- = 2H_2O + 2e$
(4) $\frac{1}{2}O_2 + H_2O + 2e = 2OH^-$

In this case the water accumulates at the hydrogen electrode from which it can be removed by means similar to those for removing water from the oxidant chamber.

Where the fuel gas is a hydrocarbon such as methane, the cell of FIG. 1 may contain either an anion permeable membrane or a cation permeable membrane as the electrolyte. Where oxygen is employed as the oxidant, the overall cell reaction is the oxidation of the methane to carbon dioxide and water. The carbon dioxide, which accumulates in chamber 9, may be withdrawn through valved outlet 12. The water formed in the reaction may be removed by methods previously described. The respective anode and cathode reactions of this cell for a cation exchange resin membrane are as follows:

(5) $CH_4 + 2H_2O = CO_2 + 8H^+ + 8e$
(6) $2O_2 + 8H^+ + 8e = 4H_2O$

Where the membrane 1 employed is an anion exchange resin, somewhat different anode and cathode reactions are found, but the products of reaction can be removed from the cell by the methods previously described. These reactions are listed below:

(7) $CH_4 + 8OH^- = CO_2 + 6H_2O + 8e$
(8) $2O_2 + 4H_2O + 8e = 8OH^-$

When carbon monoxide is the fuel gas and oxygen is the oxidant, a cell may be constructed corresponding to FIG. 1 with either an anion or cation exchange resin membrane as the electrolyte. The overall cell reaction is the oxidation of carbon monoxide to carbon dioxide with the formation of water. It is desirable to remove the carbon dioxide as it is formed by bleeding a portion of the gas from chamber 9 through valved outlet 12. The water can be removed by previously described methods. In the cells just described the anode and cathode reactions are as follows.

Anion exchange resin membrane:
(9) $CO + 2OH^- = CO_2 + H_2O + 2e$
(10) $\frac{1}{2}O_2 + H_2O + 2e = 2OH^-$ Cation exchange resin membrane:
(11) $CO + H_2O \rightarrow CO_2 + 2H^+ + 2e$
(12) $\frac{1}{2}O_2 + 2H^+ + 2e \rightarrow H_2O$ In the above cell reactions where carbon dioxide is the product and the membrane is an anion exchange resin in the hydroxide form, it is to be expected that the carbon dioxide product will convert the anion exchange resin to the carbonate form which will tend to increase the internal resistance of the cell.

The following examples are illustrative of the practice of my invention and are not for purposes of limitation.

A partially polymerized ion exchange resin in liquid form was used in the preparation of the membranes used in Examples 1–13. In the preparation of the liquid, 100 g. of phenol were first sulfonated with 108 g. of 95% sulfuric acid at 130° C. for 3 hours. After cooling to 50° C. this sulfonated solution was added with cooling and stirring to 130 g. of 37% aqueous formaldehyde at such a rate that the temperature did not exceed 15° C. The "casting resin" so prepared was stored at 0 to 5° C. until used.

EXAMPLE 1

A fuel cell was prepared from the above sulfonated phenol-formaldehyde ion exchange resin in the following manner. Two 0.75 gram batches of platinum black were each mixed with 0.5 ml. portions of the resin solution that had been diluted with water to five times its original volume. After thorough stirring, each platinum black resin mix was spread out uniformly over a 1½ inch diameter circular area on separate glass plates and allowed to air dry for about one hour at room temperature. This produces an electrode having a concentration of 0.066 gram of platinum black per square centimeter of electrode area.

A two inch diameter circular piece of orlon cloth was vacuum impregnated with undiluted resin mix. Two 1½ inch diameter circular platinum gauzes (80 x 80 mesh, 3 mil wire) with tabs were similarly impregnated with resin. One of the resin impregnated gauzes was placed on each of the two major surfaces of the resin impregnated cloth. This assembly was placed between two glass plates. While subjected to mild pressure from spring clamps, the resin was further polymerized, but not completely cured, by heating the assembly for 16 minutes in an oven heated to 115° C., thereby forming a laminated structure.

After cooling, the laminate was separated from the glass plates. The surfaces of the laminate were scraped lightly to partially expose the platinum gauze wires which were embedded in the surface of the resin. The laminate was placed between the two glass plates previously coated with the platinum black resin mixes, so that the platinum resin mixes were in contact with the platinum gauzes in the major surfaces of the laminate.

This assembly was subjected to mild pressure by means of a screw clamp and placed in an oven maintained at 115° C. for 70 minutes for completing the cure of the ion exchange resin. After cooling and removal of the glass plates, the ion exchange membrane having a catalytically active electrode and terminal grid integrally bonded to each of its major surfaces was assembled into a fuel cell by clamping the membrane between two circular sheets of lucite plate using silicone rubber gaskets around the periphery in a manner similar to that shown in FIG. 1 for a square cell. Using hydrogen as the fuel gas and oxygen as the oxidant gas, the cell described has been in essentially constant service for more than 200 days driving a small motor. During this period the potential of the cell has remained between 0.8 and 0.9 volt while the current delivered has been approximately 25 milliamperes.

EXAMPLE 2

A group of 4 cells was prepared by a procedure analogous to that in Example 1. In these preparations 0.25 gram of platinum black was used to give a metal concentration of 0.022 gram per square centimeter in each electrode. Performance data were obtained for these cells in the form of current-voltage relationships. The data in Table I indicate the spread in the voltage measured at a given current density for a group of identically prepared cells. It should be noted that the current is expressed in terms of current per unit area (i.e. milliamperes per square centimeter) and not in terms of the full current for the full area of the experimental cell. By such conversion to a unit area, the comparison of the performances of different sized cells is facilitated.

Table I

| Current density, milliamps./cm.$^2$: | Cell E.M.F., volts |
|---|---|
| 0.0 | 1.05–1.07 |
| 2.5 | .91–.98 |
| 5.0 | .85–.92 |
| 10.0 | .71–.80 |
| 15 | .58–.70 |
| 20 | .44–.59 |
| 25 | .28–.51 |

EXAMPLE 3

A group of 3 cells was prepared by a procedure analogous to that in Example 1. The amounts of platinum black were varied in preparing the electrodes for the 3 cells as indicated by the data in Table II. These data also summarize the performance of the 3 cells in terms of current-voltage relationships.

The data indicate that the concentration of the metal in the electrode can be varied appreciably without notably affecting the cell performance.

Table II

| 0.066 g. Pt/cm.$^2$ electrode | | 0.044 g. Pt/cm.$^2$ electrode | | 0.022 g. Pt/cm.$^2$ electrode | |
|---|---|---|---|---|---|
| Current density, ma./cm.$^2$ | Cell E.M.F., volts | Current density, ma./cm.$^2$ | Cell E.M.F., volts | Current density, ma./cm.$^2$ | Cell E.M.F., volts |
| 0.001 | 1.026 | .009 | 1.077 | .009 | 1.070 |
| 0.09 | .982 | .09 | 1.065 | .09 | 1.055 |
| .83 | .964 | .83 | .973 | .83 | .974 |
| 6.6 | .832 | 2.5 | .902 | 2.5 | .904 |
| 15.4 | .631 | 6.9 | .824 | 6.9 | .816 |
| 24.6 | .409 | 17.5 | .653 | 17.5 | .641 |
| 32.5 | .215 | 31.5 | .430 | 29.8 | .414 |

EXAMPLE 4

Three cells were prepared by a procedure analogous to that in Example 1. In these preparations 0.1 gram of palladium black was used to give a metal concentration of 0.009 gram per square centimeter in each electrode. Performance data were again obtained for these cells in the form of current-voltage relationships. The data in Table III indicate the range in the performance among the cells in the group; this is shown by the spread in the voltage measured at a given current density.

Table III

| Current density, milliamps./cm.$^2$: | Cell E.M.F., volts |
|---|---|
| 0.0 | 0.86–0.99 |
| 2.5 | .82–.88 |
| 5.0 | .78–.84 |
| 10.0 | .71–.79 |
| 15 | .65–.72 |
| 20 | .59–.64 |
| 30 | .43–.49 |
| 40 | .30–.38 |

EXAMPLE 5

Table IV shows the performance of four cells prepared by a procedure analogous to that of Example 1. Various amounts of palladium black were employed in preparing the electrodes. In 3 of the cells identical amounts of metal at the levels indicated in the table were employed for the two electrodes. In the fourth, 0.01 gram (0.0009 gram/cm.$^2$) was employed for one electrode and 0.1 gram (0.009 gram/cm.$^2$) was employed for the second. For this latter cell, performance data are presented for the cases when the lower amount of metal was used for the fuel (hydrogen) anode and when it was used for the oxidant (oxygen) cathode.

While the overall performance of the cells in the above examples is not markedly affected by the amount of metal per unit area in the range considered, fabrication problems begin to arise when the amount is reduced to 0.001 gram of the pure metal per cm.$^2$ of electrode area because of difficulties in obtaining uniform distribution of the metal over the entire electrode area. It is therefore unlikely that the amount of metal per unit area can be reduced by more than an additional factor of ten, i.e., to 0.0001 gram/cm.$^2$ of electrode area without encountering serious difficulties in fabrication as well as adversely affecting the cell performance. Larger amounts of catalyst than 0.1 gram per square centimeter can be used in preparing the electrodes, but the use of a greater amount would have to be justified on the basis of improved cell performance vs. additional cost of the metal. Keeping in mind that the objective is to provide an electrode which adsorbs gases, is electronically conductive, and is integrally bonded to the ion exchange resin membrane structure, the amount of resin binder associated with the metal powder in the electrode layer, preferably should be kept to the minimum required to obtain integral bonding of the metal particles to the surface of the membrane.

Table IV

| 0.022 g. Pd/cm.$^2$ electrode | | 0.009 g. Pd/cm.$^2$ electrode | | 0.0044 g. Pd/cm.$^2$ electrode | | 0.0009 g. Pd/cm.$^2$ vs. 0.009 g. Pd/cm.$^2$ | | | |
|---|---|---|---|---|---|---|---|---|---|
| | | | | | | 0.0009 g. Pd/cm.$^2$ H$_2$ electrode | | 0.001 g. Pd/cm.$^2$ O$_2$ electrode | |
| Current density, ma./cm.$^2$ | Cell E.M.F., volts | Current density, ma./cm.$^2$ | Cell E.M.F., volts | Current density, ma./cm.$^2$ | Cell E.M.F., volts | Current density, ma./cm.$^2$ | Cell E.M.F., volts | Current density, ma./cm.$^2$ | Cell E.M.F., volts |
| 0.0009 | 0.980 | .0007 | .858 | .001 | 1.065 | .0009 | .987 | .0009 | .971 |
| .78 | .914 | .72 | .843 | .81 | .940 | .80 | .920 | .75 | .884 |
| 2.4 | .854 | 2.4 | .815 | 2.5 | .878 | 2.5 | .872 | 2.4 | .847 |
| 6.6 | .776 | 6.4 | .758 | 6.5 | .795 | 6.6 | .813 | 6.1 | .795 |
| 17.1 | .625 | 17.5 | .633 | 15.1 | .630 | 16.5 | .699 | 13.5 | .664 |
| 25.3 | .337 | 34.2 | .451 | 23.7 | .417 | 33.3 | .437 | 24.6 | .418 |
| | | 53.5 | .235 | 30.7 | .280 | 46.5 | .216 | 38.6 | .270 |

EXAMPLE 6

Two cells were prepared by a procedure analogous to that in Example 1. In these preparations, Electrode 1 of each cell was prepared with 0.1 g. of palladium black (0.009 g./cm.$^2$ of electrode area) and Electrode 2 with 0.05 g. of 10% by weight palladium on conducting carbon black (0.0044 g./cm.$^2$ of electrode area). The data in Table V show the performance for the two cells for the two cases where the palladium on carbon electrode was used for the H$_2$ and O$_2$ electrodes, respectively.

Table V

| Performance with electrode 1 on oxygen side and electrode 2 on hydrogen side | | | | Performance with electrode 1 on hydrogen side and electrode 2 on oxygen side | | | |
|---|---|---|---|---|---|---|---|
| Cell a | | Cell b | | Cell a | | Cell b | |
| Current density, ma./cm.$^2$ | Cell E.M.F., volts | Current density, ma./cm.$^2$ | Cell E.M.F., volts | Current density, ma./cm.$^2$ | Cell E.M.F., volts | Current density, ma./cm.$^2$ | Cell E.M.F., volts |
| 0.0008 | 0.971 | 0.0009 | 0.970 | 0.0008 | 0.959 | 0.0007 | 0.857 |
| .083 | .974 | .081 | .935 | .077 | .929 | .070 | .814 |
| .79 | .936 | .74 | .883 | .57 | .860 | .64 | .760 |
| 2.4 | .873 | 2.3 | .837 | 1.1 | .818 | 1.8 | .702 |
| 6.1 | .766 | 6.0 | .754 | 2.1 | .765 | 4.4 | .628 |
| 12.3 | .571 | 13.1 | .620 | 4.9 | .614 | 8.2 | .515 |
| 19.3 | .413 | 19.3 | .484 | 8.2 | .383 | 11.6 | .461 |
| ------- | ------ | 23.3 | .380 | ------- | ----- | 14.4 | .421 |

EXAMPLE 7

Two cells were prepared by a procedure analogous to that in Example 1. In these preparations Electrode 1 of each cell was prepared with 0.1 gram of palladium black (0.009 g./cm.$^2$ of electrode area) and Electrode 2 with 0.05 gram of 10% by weight platinum on the same (0.0044 g./cm.$^2$ of electrode area) conducting carbon black used in Example 6. The data in Table VI shows the performance for the two cells for the two cases where the platinum on carbon electrode was used for the $H_2$ and $O_2$ electrodes, respectively.

Table VI

| Performance with electrode 1 on oxygen side and electrode 2 on hydrogen side | | | | Performance with electrode 1 on hydrogen side and electrode 2 on oxygen side | | | |
|---|---|---|---|---|---|---|---|
| Cell a | | Cell b | | Cell a | | Cell b | |
| Current density, ma./cm.$^2$ | Cell E.M.F., volts | Current density, ma./cm.$^2$ | Cell E.M.F., volts | Current density, ma./cm.$^2$ | Cell E.M.F., volts | Current density, ma./cm.$^2$ | Cell E.M.F., volts |
| 0.0009 | 0.983 | 0.0009 | 0.973 | 0.0009 | 0.955 | 0.0008 | 0.932 |
| .080 | .936 | .082 | .961 | .075 | .952 | .080 | .935 |
| .73 | .889 | .76 | .899 | .73 | .872 | .72 | .857 |
| 2.2 | .851 | 2.4 | .843 | 2.2 | .784 | 2.1 | .755 |
| 5.1 | .805 | 6.1 | .761 | 5.4 | .670 | 4.8 | .613 |
| 15.8 | .680 | 13.4 | .594 | 11 | .484 | 9.6 | .468 |
| -------- | ------- | 21.1 | .428 | -------- | ----- | 13.6 | .360 |
| -------- | ------- | 28.2 | .321 | -------- | ----- | ------ | ----- |

EXAMPLE 8

A cell was constructed by a procedure analogous to that in Example 1 with the major exception that the platinum gauze terminal grids were omitted. In this preparation 0.1 gram of palladium black was used to give a metal concentration of 0.009 g./cm.$^2$ in each electrode. This cell was assembled in a suitable housing with a conducting plastic plate making contact with each electrode through 12 round feet ⅛ inch in diameter serving as a terminal grid external to the electrode structure. The data in Table VII show the performance of this cell.

Table VII

| Current density, ma./cm.$^2$: | Cell E.M.F., volts |
|---|---|
| 0.0009 | .987 |
| .76 | .894 |
| 2.4 | .849 |
| 6.6 | .781 |
| 8.8 | .745 |
| 15.5 | .605 |
| 31.5 | .467 |
| 46.4 | .312 |

EXAMPLE 9

It has been observed in the course of the work with the fuel cells under consideration that they may be activated and their performance improved by certain treatments. Thus it has been found that after a cell has been in operation for some time, a beneficial effect on performance is often observed if the gas connections to the cell are reversed after purging each chamber with an inert gas, for example, nitrogen, so that what had been a fuel electrode becomes an oxidant electrode and vice versa. The effect manifests itself in the form of higher voltages associated with a given current density. A similar effect is observed if the oxygen in the oxidant chamber is replaced with hydrogen and an external source of power is used to drive current through the cell in the same direction as it flows during normal operation of the fuel cell. Operation of a cell on high current drain so that the potential of the cell falls to a few tenths of a volt can also lead to the same type of improvement in performance. One additional type of treatment leading to similar results consists of flooding the oxygen electrode with water and with the aid of an external power supply subjecting it to alternate anodic and cathodic polarizations relative to the hydrogen electrode so that hydrogen and oxygen are alternately produced on several cycles.

An example illustrating the improvement in performance that can be obtained by such activating treatments is shown by the data in Table VIII which shows the improvement obtained using the second method described above. The cell used to obtain these data was prepared by a procedure analogous to that in Example 1. In the preparation 0.25 g. of palladium black was used to give a metal concentration of 0.022 g./cm.$^2$ in each electrode.

Table VIII

| Before treatment | | After treating $O_2$ electrode with $H_2$ | |
|---|---|---|---|
| Current density, ma./cm.$^2$ | Cell E.M.F., volts | Current density, ma./cm.$^2$ | Cell E.M.F., volts |
| 0.0008 | .913 | 0.0008 | .943 |
| .73 | .863 | .80 | .929 |
| 2.19 | .804 | 2.5 | .896 |
| 5.6 | .712 | 6.8 | .839 |
| 11.8 | .567 | 17.2 | .742 |
| 17.5 | .432 | 33.3 | .615 |
| 22.8 | .363 | 50.8 | .479 |

EXAMPLE 10

A cell was prepared by a procedure analogous to that in Example 1. In the preparation 0.25 g. platinum black was used to give a metal concentration of 0.022 g./cm.$^2$ in each electrode. This cell was operated as a fuel cell in the normal manner. In addition it was operated as an electrolysis unit for the preparation of hydrogen and oxygen from water by subjecting it to an external direct current E.M.F. after the gas chambers had been partially flooded with water.

Performance data for the cell is shown in Table IX.

After the data in Table IX had been obtained, the cell was operated as an electrolysis unit at a current density of approximately 43 ma./cm.$^2$. The hydrogen and oxygen that were produced were collected in individual gas reservoirs for storage. The external power supply was then disconnected, the water was drained from the cell, and a load was applied to the cell so that a discharge current of about 14 ma./cm.$^2$ flowed from the cell, which was then operating as a fuel cell on the gases produced during the previous electrolysis.

A second cell was prepared in a similar fashion with 0.1 gram palladium black per electrode. The ability of this unit to operate as both a fuel cell and an electrolysis cell was also demonstrated.

Table IX

| Performance data when operating as a fuel cell | | Performance data when operating as an electrolysis cell | |
|---|---|---|---|
| Current density, ma./cm.$^2$ | Cell E.M.F., volts | Applied potential volts | Current density, ma./cm.$^2$ |
| 0.0009 | 1.025 | 1.35 | *−0.10 |
| .84 | .988 | 1.485 | −.46 |
| 2.6 | .936 | 1.518 | −.90 |
| 6.9 | .857 | 1.555 | −1.8 |
| 17.5 | .729 | 1.599 | −4.4 |
| 30.6 | .578 | 1.65 | −8.8 |
| 43.3 | .430 | 1.70 | −17.6 |
| | | 1.78 | −35.5 |
| | | 1.87 | −61.5 |

*Negative sign indicates that current is in the reverse direction from that of normal discharge during operation as a fuel cell.

EXAMPLE 11

A cell was prepared by a procedure analogous to that in Example 1 using 0.1 g. (0.009 g./cm.$^2$) of palladium black per electrode. This cell was operated both with oxygen and with air as the oxidant. In both cases hydrogen was used as the fuel. The cell was assembled in a housing as in Example 1 and polarization data were first obtained with the cell operating on hydrogen and oxygen. The oxygen supply was then replaced with air which was allowed to flow continuously through the oxidant chamber at a rate of a few cc./minute. The effect of dilution of the oxidant supply by nitrogen in the ratio found in air has a negligible effect on the potential of the cell, i.e., about 0.01 volt at 25° C. from the Nernst relationship. However, a continuous supply of fresh air is required to prevent the oxygen supply from being depleted in the cell and thereby enhancing the effect. The data in Table X show that when the nitrogen is prevented from accumulating in the oxidant chamber the performance of an ion exchange membrane fuel cell is equivalent when operation is on air or oxygen.

Table X

| Performance data for cell operating on H$_2$ and O$_2$ | | Performance data for cell operating on H$_2$ and Air | |
|---|---|---|---|
| Current density, ma./cm.$^2$ | Cell E.M.F., volts | Current density, ma./cm.$^2$ | Cell E.M.F., volts |
| 0.0009 | 0.990 | 0.0009 | 0.962 |
| .79 | .930 | .74 | .892 |
| 2.5 | .879 | 2.5 | .869 |
| 6.5 | .811 | 6.5 | .814 |
| 14.3 | .675 | 14.4 | .660 |
| 18.9 | .395 | 18.4 | .380 |

EXAMPLE 12

A fuel cell was prepared from the previously described sulfonated phenol formaldehyde ion exchange casting resin, in the following manner. Two 1½ inch diameter discs of 150 x 150 mesh platinum—10% rhodium gauze that had been flattened by rolling to 2 mils in thickness were first platinized by immersing each in a separate 25 ml. portion of a platinizing solution (containing 28 g. platinic chloride/liter, 0.2 g. lead acetate/liter, and 9.6 cc. of concentrated HCl/liter) and electrolyzing at 200 milliamps. until the color of the platinizing solution was depleted. The mesh of this gauze was fine enough that during the platinizing process the platinum black formed bridges in the interstices of the gauze to give practically a uniform distribution of the platinum black over the entire electrode area equivalent to approximately 0.025 g./cm.$^2$.

A 2¼ inch diameter circular piece of orlon cloth was vacuum impregnated with resin mix. The impregnated piece of cloth was then placed between two glass plates and subjected to mild pressure from spring clamps. The resin was then further polymerized, but not completely cured, by heating the assembly for thirteen minutes at about 115° C.

After cooling, the resin impregnated cloth was separated from the glass plates. The two platinized gauzes were vacuum impregnated with resin before they were placed against each of the two major surfaces of the resin impregnated cloth. The resulting assembly was then placed between two glass plates which were subjected to mild pressure by means of a screw clamp. The assembly was placed in an oven at about 115° C. for 70 minutes for a final cure of the ion exchange resin.

After cooling and removal of the glass plates, the ion exchange membrane having an electrode consisting of platinum black electrodeposited on a terminal integrally bonded to each of its major surfaces was assembled into a housing as described under Example 1. Using hydrogen as the fuel gas and oxygen as the oxidant the performance data in Table XI were obtained.

Table XI

| Current density, ma./cm.$^2$: | Cell E.M.F., volts |
|---|---|
| 0.0009 | 1.030 |
| .09 | 1.030 |
| .82 | .980 |
| 2.4 | .894 |
| 5.8 | .790 |
| 13.8 | .598 |
| 21.9 | .432 |

EXAMPLE 13

Two cells were prepared by a procedure analogous to that in Example 1. In one cell 0.2 g. (0.018 g./cm.$^2$) of platinum black was used for each electrode. In the other 0.1 g. (0.009 g./cm.$^2$) of palladium black was used for each electrode. These cells were used to demonstrate the ability of ion exchange membrane fuel cells to operate on carbon monoxide, natural gas (about 95% methane, balance largely higher hydrocarbons) and hydrocarbons—propane and ethylene were employed. In all cases oxygen was employed as the oxidant, and the fuel gas was allowed to flow at a rate of a few cc./minute through the fuel chamber. The exhaust fuel gas from the cell was bubbled through a $Ba(OH)_2$ solution and in all cases a white precipitate which dissolved in HCl with effervescence was obtained. This indicates that these fuel gases are oxidized to $CO_2$ at the fuel electrode.

EXAMPLE 14

Two cells were prepared in which anion exchange membranes in the hydroxide form were employed as the electrolyte. A commercially available membrane was employed. This membrane is a 95% styrene, 5% divinyl benzene copolymer which has been chloromethylated with chloromethyl ether. This chloromethylated product is then aminated with trimethyl amine to form the corresponding quaternary ammonium chloride. This resin is then reacted with aqueous potassium hydroxide to form a hydrated anion exchange resin in which the mobile ions are hydroxide ions. Two parts by weight of this resin in powdered form are intimately mixed with 1 part by weight of polyethylene and the resulting mixture is molded into sheet form to give the anion permeable membrane. This membrane contains about 35% water and contains about one milliequivalent of hydroxide ions per gram of membrane.

In the preparation of the cells of this example, 2 inch diameter discs of the membrane were used. The starting material had been converted to the chloride form by treating the membranes with a potassium chloride solution followed by water rinsing.

For one cell, two slurries, each containing 0.1 gram of palladium black in 0.2 ml. of water, were spread over 1½ inch diameter circles on glass plates. For the second cell two slurries, each containing 0.1 gram of palladium black in 0.2 ml. of water and 0.05 ml. of a liquid anion exchange resin in the hydrochloride form, were used to prepare spreads on a second set of glass plates. The anion resin was prepared by reacting 12.6 grams of melamine, 9.0 grams of guanidine carbonate, 16.2 grams of concentrated hydrochloric acid and 24.3 grams of formaldehyde (37%).

When the slurries on the glass plates had dried in air, a disc of the anion exchange resin membrane was placed between each set of glass plates so that the palladium black spreads were in contact with the two major surfaces of the membrane. The assemblies were subjected to mild pressure and heat treated in a manner analogous to that in Example 1. A temperature of 110° C. was maintained for 30 minutes during the heat treatment. During this treatment the palladium became an integral part of the surface of each of the membrane discs.

Following the heat treatment the membranes having the integrally bonded electrodes were treated with aqueous sodium hydroxide to convert the membranes to the hydroxide form. Excess sodium hydroxide was rinsed from the membranes with water before the cells were assembled with conducting plastic plates of Example 8.

Where no additonal resin was used with the palladium, the cell had an open circuit potential of 0.892 volt and delivered a current of 32 milliamperes in a circuit containing a 10 ohm resistance. Where the resin binder was used with the palladium, the cell had an open circuit potential of 0.897 volt and delivered a current of 39 milliamperes in a circuit containing a 10 ohm resistance.

The cells of this example demonstrate the feasibility of preparing cells with electrodes integrally bonded to anion exchange membranes. In addition they demonstrate two alternative methods of fabrication that employ commercially available membranes containing fully cured ion exchange resins.

A typical analysis of the palladium and platinum blacks used in the above examples indicated that the palladium black had a surface area of about 12–15 square meters per gram and the platinum black had a surface area of about 35–40 square meters per gram.

Other modifications of this invention and variations of the structure may be employed without departing from the scope of the invention; for example, the shape of the cell may be varied and may conveniently be chosen to fit into an existing space. Normally, when hydrogen and oxygen are used as the fuel and oxidant gases, respectively, the byproduct water is usually exhausted to waste. Any means for automatically controlling the level of the water at a predetermined level in the cell may be used and the reservoir for water may be conveniently equipped with a condenser to prevent loss of water. Furthermore, it may be desirable to run the fuel cell both as a primary source of power as well as a means of storing radiant energy by first converting it to a source of power which is used to electrolyze water in the fuel cell, as shown in the above Example 13 to produce hydrogen and oxygen which is used to produce electricity at a later time. Also, it is possible to make the membrane separating the fuel and oxidant gases in a cell from a plastic insulating sheet, e.g., polyethylene, polystyrene, etc., having a plurality of ion exchange resin membranes as isolated areas making individual cells which can be conveniently connected by wires within the insulating resin structure itself in either a series or parallel arrangement or both, so that the sheet structure is a battery. Where a fuel cell is desired to produce electricity unfailingly for a long period of time without attention, it would be possible to build one or a group of fuel cells wherein the membrane of each separates two relatively large volumes of gas. Using hydrogen and oxygen for an example, two volumes of hydrogen are required for every volume of oxygen if the pressure and temperature of each gas are equal. In this case, the gas space for the hydrogen would be twice as large as the volume provided for with oxygen. In this way, an equal pressure would be maintained on each side of the membrane from the beginning and the life of the fuel cells would be only determined by the amount of gases supplied. Means could also be provided whereby the water produced could be used to generate oxygen from an oxygen producing compound such as calcium superoxide, and hydrogen from a hydrogen producing compound such as a metallic hydride, or an extremely reactive metal such as sodium. Various generators could be used, for example, designed after a Kipp generator, so that at a given predetermined pressure, the water would be removed from contact with the gas generating chemicals. Alternatively, pressure actuated or float valves can be used to control the flow of generating fluid, for example, as disclosed and claimed in an application of Liebhafsky and Niedrach, Serial Number 29,032, filed May 13, 1960, now Patent 3,098,769, and assigned to the same assignee as the present invention.

The fuel cells of this invention may be used for any application where a reliable source of direct current electric power is required, to activate motors, instruments, radio transmitters, lights, heaters, etc. The power from a fuel cell could also be used to drive a thermoelectric refrigerator which requires a low voltage source of direct current.

These and other modifications of this invention which will readily be discernible to those skilled in the art, may be employed within the scope of the invention. The invention is intended to include all such modifications and variations as may be embraced within the following claims.

What I claim as new and desire to secure by Letters Patent of the United States is:

1. A combination electrode structure and electrolyte for a fuel cell comprising a hydrated, ion exchange resin membrane having a gas adsorbing metal electrode integrally bonded and embedded in each of its two major surfaces.

2. A combination electrode structure and electrolyte for a fuel cell comprising a hydrated, ion exchange resin membrane having a gas adsorbing metal electrode integrally bonded and embedded in each of its two major surfaces, said electrode comprising at least one metal of the group VIII series of metals.

3. A combination electrode structure and electrolyte for a fuel cell comprising a hydrated, ion exchange resin membrane having a gas adsorbing metal electrode integrally bonded and embedded in each of its two major surfaces, said electrode comprising at least one noble metal of the group VIII series of metals.

4. A combination electrode structure and electrolyte for a fuel cell comprising a hydrated, ion exchange resin membrane having a gas adsorbing metal electrode integrally bonded and embedded in each of its two major surfaces, said electrode comprising at least one noble metal of the group VIII series of metals deposited on activated, electrically conductive carbon.

5. A combination electrode structure and electrolyte for a fuel cell comprising a hydrated, ion exchange resin membrane having a gas adsorbing metal electrode integrally bonded and embedded in each of its two major surfaces, said electrode comprising platinum.

6. A combination electrode structure and electrolyte for a fuel cell comprising a hydrated, ion exchange resin membrane having a gas adsorbing metal electrode integrally bonded and embedded in each of its two major surfaces, said electrode comprising platinum metal powder having a surface area of at least ten square meters per gram.

7. A combination electrode structure and electrolyte for a fuel cell comprising a hydrated, ion exchange resin membrane having a gas adsorbing metal electrode integrally bonded and embedded in each of its two major surfaces, said electrode comprising palladium.

8. A combination electrode structure and electrolyte for a fuel cell comprising a hydrated, ion exchange resin membrane having a gas adsorbing metal electrode integrally bonded and embedded in each of its two major surfaces, said electrode comprising palladium metal powder having a surface area of at least ten square meters per gram.

9. A combination electrode structure and electrolyte for a fuel cell comprising a hydrated, ion exchange resin membrane in which the hydrogen ion is the mobile ion, said membrane having a gas adsorbing metal electrode integrally bonded and embedded in each of its two major surfaces.

10. A combination electrode structure and electrolyte for a fuel cell comprising a hydrated, ion exchange resin membrane in which the hydroxide ion is the mobile ion, said membrane having a gas adsorbing metal electrode integrally bonded and embedded in each of its two major surfaces.

11. A combination electrode structure and electrolyte for a fuel cell comprising a hydrated, ion exchange resin membrane in which the hydrogen ion is the mobile ion, said membrance having a gas adsorbing metal electrode integrally bonded and embedded in each of its two major surfaces, said electrode comprising at least one metal of the group VIII series of metals.

12. A combination electrode structure and electrolyte for a fuel cell comprising a hydrated, ion exchange resin membrane in which the hydrogen ion is the mobile ion, said membrane having a gas adsorbing metal electrode integrally bonded and embedded in each of its two major surfaces, said electrode comprising at least one noble metal of the group VIII series of metals.

13. A combination electrode structure and electrolyte for a fuel cell comprising a hydrated, ion exchange resin membrane in which the hydrogen ion is the mobile ion, said membrane having a gas adsorbing metal electrode integrally bonded and embedded in each of its major surfaces, said electrode comprising at least one noble metal of the group VIII series of metals deposited on an activated, electrically conductive carbon.

14. A combination electrode structure and electrolyte for a fuel cell comprising a hydrated, ion exchange resin membrane in which the hydrogen ion is the mobile ion, said membrane having a gas adsorbing metal electrode integrally bonded and embedded in each of its two major surfaces, said electrode comprising platinum.

15. A combination electrode structure and electrolyte for a fuel cell comprising a hydrated, ion exchange resin membrane in which the hydrogen ion is the mobile ion, said membrane having a gas adsorbing metal electrode integrally bonded and embedded in each of its two major surfaces, said electrode comprising platinum metal powder having a surface area of at least ten square meters per gram.

16. A combination electrode structure and electrolyte for a fuel cell comprising a hydrated, ion exchange resin membrane in which the hydrogen ion is the mobile ion, said membrane having a gas adsorbing metal electrode integrally bonded and embedded in each of its two major surfaces, said electrode comprising palladium.

17. A combination electrode structure and electrolyte for a fuel cell comprising a hydrated, ion exchange resin membrane in which the hydrogen ion is the mobile ion, said membrane having a gas adsorbing metal electrode integrally bonded and embedded in each of its two major surfaces, said electrode comprising palladium metal powder having a surface area of at least ten square meters per gram.

18. A process of preparing a combination electrode structure and electrolyte for a fuel cell which comprises placing at least one gas adsorbing metal on each of the two major surfaces of an ion exchange resin membrane and embedding and integrally bonding said metal in said surface of the membrane.

19. A process of preparing a combination electrode structure and electrolyte for a fuel cell which comprises embedding at least one gas adsorbing metal in a partially polymerized ion exchange resin on the surface of an ion exchange resin membrane and thereafter completing the polymerization of the partially polymerized ion exchange resin to integrally bond said gas adsorbing metal to the surface of the ion exchange resin membrane.

20. A process of preparing a combination electrode structure and electrolyte for a fuel cell which comprises embedding at least one metal of the group VIII series of metals in a partially polymerized ion exchange resin on the surface of an ion exchange resin membrane and thereafter completing the polymerization of the partially polymerized resin to integrally bond said metal to the surface of the ion exchange resin membrane.

21. A process of preparing a combination electrode structure and electrolyte for a fuel cell which comprises embedding at least one noble metal of the group VIII series of metals in a partially polymerized ion exchange resin on the surface of an ion exchange resin membrane and thereafter completing the polymerization of the partially polymerized resin to integrally bond said metal to the surface of the ion exchange resin membrane.

22. A process of preparing a combination electrode structure and electrolyte for a fuel cell which comprises embedding at least one noble metal of the group VIII series of metals deposited on an activated electrically conductive carbon in a partially polymerized ion exchange resin on the surface of an ion exchange resin membrane and thereafter completing the polymerization of the partially polymerized resin to integrally bond said metal deposited on said carbon to the surface of the ion exchange resin membrane.

23. A process of preparing a combination electrode structure and electrolyte for a fuel cell which comprises embedding platinum in a partially polymerized ion exchange resin on the surface of an ion exchange resin membrane and thereafter completing the polymerization of the partially polymerized resin to integrally bond said metal to the surface of the ion exchange resin membrane.

24. A process of preparing a combination electrode structure and electrolyte for a fuel cell which comprises embedding platinum powder having a surface area of at least ten square meters per gram in a partially polymerized ion exchange resin on the surface of an ion exchange resin membrane and thereafter completing the polymerization of the partially polymerized resin to integrally bond said metal to the surface of the ion exchange resin membrane.

25. A process of preparing a combination electrode structure and electrolyte for a fuel cell which comprises embedding palladium in a partially polymerized ion exchange resin on the surface of an ion exchange resin membrane and thereafter completing the polymerization of the partially polymerized resin to integrally bond said metal to the surface of the ion exchange resin membrane.

26. A process of preparing a combination electrode structure and electrolyte for a fuel cell which comprises embedding palladium powder having a surface area of at least ten square meters per gram in a partially polymerized ion exchange resin on the surface of an ion exchange resin membrane and thereafter completing the polymerization of the partially polymerized resin to integrally bond said metal to the surface of the ion exchange resin membrane.

27. A gaseous fuel cell comprising a hydrated, ion exchange resin membrane positioned between and in direct contact with a pair of electrode elements, one of said electrode elements being integrally bonded and embedded in one of the two major surfaces of the aforesaid membrane, the other of said electrode elements being integrally bonded and embedded in the other major surface of the membrane, the said electrode elements comprising at least one gas adsorbing metal, means for supplying a fuel gas to one of said electrode elements and means for supplying an oxidant gas to the other of said electrode elements.

28. A gaseous fuel cell comprising a hydrated, ion exchange resin membrane positioned between and in direct contact with a pair of electrode elements, one of said electrode elements being integrally bonded and embedded in one of the two major surfaces of the aforesaid membrane and the other of said electrode elements being integrally bonded and embedded in the other major surface of the membrane, said electrode elements comprising at least one metal of the group VIII series of metals, means for supplying a fuel gas to one of said electrode elements and means for supplying an oxidant gas to the other of said electrode elements.

29. A gaseous fuel cell comprising a hydrated, ion exchange resin membrane positioned between and in direct contact with a pair of electrode elements, one of said electrode elements being integrally bonded and embedded in one of the two major surfaces of the aforesaid membrane and the other of said electrode elements being integrally bonded and embedded in the other major surface of the membrane, said electrode elements comprising at least one noble metal of the group VIII series of metals, means for supplying a fuel gas to one of said electrode elements and means for supplying an oxidant gas to the other of said electrode elements.

30. A gaseous fuel cell comprising a hydrated, ion exchange resin membrane positioned between and in direct contact with a pair of electrode elements, one of said electrode elements being integrally bonded and embedded in one of the two major surfaces of the aforesaid membrane and the other of said electrode elements being integrally bonded and embedded in the other major surface of the membrane, said electrode elements comprising at least one noble metal of the group VIII series of metals deposited on activated, electrically conductive carbon, means for supplying a fuel gas to one of said electrode elements and means for supplying an oxidant gas to the other of said electrode elements.

31. A gaseous fuel cell comprising a hydrated, ion exchange resin membrane positioned between and in direct contact with a pair of electrode elements, one of said electrode elements being integrally bonded and embedded in one of the two major surfaces of the aforesaid membrane and the other of said electrode elements being integrally bonded and embedded in the other major surface of the membrane, said electrode elements comprising platinum, means for supplying a fuel gas to one of said electrode elements and means for supplying an oxidant gas to the other of said electrode elements.

32. A gaseous fuel cell comprising a hydrated, ion exchange resin membrane positioned between and in direct contact with a pair of electrode elements, one of said electrode elements being integrally bonded and embedded in one of the two major surfaces of the aforesaid membrane and the other major surface of the membrane, said electrode elements comprising platinum metal power having a surface area of at least ten square meters per gram, means for supplying a fuel gas to one of said electrode elements and means for supplying an oxidant gas to the other of said electrode elements.

33. A gaseous fuel cell comprising a hydrated, ion exchange resin membrane positioned between and in direct contact with a pair of electrode elements, one of said electrode elements being integrally bonded and embedded in one of the two major surfaces of the aforesaid membrane and the other of said electrode elements being integrally bonded and embedded in the other major surface of the membrane, said electrode elements comprising palladium, means for supplying a fuel gas to one of said electrode elements and means for supplying an oxidant gas to the other of said electrode elements.

34. A gaseous fuel cell comprising a hydrated, ion exchange resin membrane positioned between and in direct contact wtih a pair of electrode elements, one of said electrode elements being integrally bonded and embedded in one of the two major surfaces of the aforesaid membrane and the other of said electrode elements being integrally bonded and embedded in the other major surface of the membrane, said electrode elements comprising palladium metal powder having a surface area of at least ten square meters per gram, means for supplying a fuel gas to one of said electrode elements and means for suplying an oxidant gas to the other of said electrode elements.

35. A gaseous fuel cell comprising a hydrated, ion exchange resin membrane in which the hydrogen ion is the mobile ion, said membrane being positioned between and in direct contact with a pair of electrode elements, one of said electrode elements being integrally bonded and embedded in one of the two major surfaces of the aforesaid membrane and the other of said electrode elements being integrally bonded and embedded in the other major surface of the membrane, said electrode elements comprising at least one gas adsorbing metal, means for supplying a fuel gas to one of said electrode elements and means for supplying an oxidant gas to the other of said electrode elements.

36. A gaseous fuel cell comprising a hydrated, ion exchange resin membrane in which the hydroxyl ion is the moblie ion, said membrane being positioned between and in direct contact with a pair of electrode elements, one of said electrode elements being integrally bonded and embedded in one of the two major surfaces of the aforesaid membrane and the other of said electrode elements being integrally bonded and embedded in the other major surface of the membrane, said electrode elements comprising at least one gas adsorbing metal, means for supplying a fuel gas to one of said electrode elements and means for supplying an oxidant gas to the other of said electrode elements.

37. A gaseous fuel cell comprising a hydrated, ion exchange resin membrane positioned between and in direct contact with a pair of electrode elements, one of said electrode elements being integrally bonded and embedded in one of the two major surfaces of the aforesaid membrane and the other of said electrode elements being integrally bonded and embedded in the other major surface of the membrane, said electrode elements comprising at least one gas adsorbing metal, means for supplying hydrogen to one of said electrode elements and means for supplying an oxidant gas to the other of said electrode elements.

38. A gaseous fuel cell comprising a hydrated, ion exchange resin membrane positioned between and in direct contact with a pair of electrode elements, one of said electrode elements being integrally bonded and embedded in one of the two major surfaces of the aforesaid membrane and the other of said electrode elements being integrally bonded and embedded in the other major surface of the membrane, said electrode elements comprising at least one gas adsorbing metal, means for supplying a fuel gas to one of said electrode elements and means for supplying oxygen to the other of said electrode elements.

39. A gaseous fuel cell comprising a hydrated, ion exchange resin membrane being positioned between and in direct contact with a pair of electrode elements, one of said electrode elements being integrally bonded and embedded in one of the two major surfaces of the aforesaid membrane and the other of said electrode elements being integrally bonded and embedded in the other major surface of the membrane, said electrode elements comprising at least one gas adsorbing metal, means for supplying hydrogen to one of said electrodes and means for supplying oxygen to the other of said electrodes.

40. A gaseous fuel cell comprising a hydrated, ion exchange resin membrane in which the hydrogen ion is the mobile ion, said membrane being positioned between and in direct contact with a pair of electrode elements, one of said electrode elements being integrally bonded and embedded in one of the two major surfaces of the aforesaid membrane and the other of said electrode elements being integrally bonded and embedded in the other major surface of the membrane, said electrode elements comprising at least one metal from the group VIII series of metals, means for supplying hydrogen to one of said electrodes and means for supplying oxygen to the other of said electrodes.

41. A gaseous fuel cell comprising a hydrated, ion exchange resin membrane in which the hydrogen ion is the mobile ion, said membrane being positioned between and in direct contact with a pair of electrode elements, one of said electrode elements being integrally bonded and embedded in one of the two major surfaces of the aforesaid membrane and the other of said electrode elements being integrally bonded and embedded in the other major surface of the membrane, said electrode elements comprising at least one noble metal of the group VIII series of metals, means for supplying hydrogen to one of said electrodes and means for suppying oxygen to the other of said electrodes.

42. A gaseous fuel cell comprising a hydrated, ion exchange resin membrane in which the hydrogen ion is the mobile ion, said membrane being positioned between and in direct contact with a pair of electrode elements, one of said electrode elements being integrally bonded and embedded in one of the two major surfaces of the aforesaid membrane and the other of said electrode elements being integrally bonded and embedded in the other major surface of the membrane, said electrode elements comprising at least one noble metal of the group VIII series of metals deposited on activated, electrically conductive carbon, means for supplying hydrogen to one of said electrodes and means for supplying oxygen to the other of said electrodes.

43. A gaseous fuel cell comprising a hydrated, ion exchange resin membrane in which the hydrogen ion is the mobile ion, said membrane being positioned between and in direct contact with a pair of electrode elements, one of said electrode elements being integrally bonded and embedded in one of the two major surfaces of the aforesaid membrane and the other of said electrode elements being integrally bonded and embedded in the other major surface of the membrane, said electrode elements comprising platinum, means for supplying hydrogen to one of said electrodes and means for supplying oxygen to the other of said electrodes.

44. A gaseous fuel cell comprising a hydrated ion exchange resin membrane in which the hydrogen ion is the mobile ion, said membrane being positioned between and in direct contact with a pair of electrode elements, one of said electrode elements being integrally bonded and embedded in one of the two major surfaces of the aforesaid membrane and the other of said electrode elements being integrally bonded and embedded in the other major surface of the membrane, said electrode elements comprising platinum powder having a surface area of at least ten square meters per gram, means for supplying hydrogen to one of said electrodes and means for supplying oxygen to the other of said electrodes.

45. A gaseous fuel cell comprising a hydrated ion exchange resin membrane in which the hydrogen ion is the mobile ion, said membrane being positioned between and in direct contact with a pair of electrode elements, one of said electrode elements being integrally bonded and embedded in one of the two major surfaces of the aforesaid membrane and the other of said electrode elements being integrally bonded and embedded in the other major surface of the membrane, said electrode elements comprising palladium, means for supplying hydrogen to one of said electrodes and means for supplying oxygen to the other of said electrodes.

46. A gaseous fuel cell comprising a hydrated ion exchange resin membrane in which the hydrogen ion is the mobile ion, said membrane being positioned between and in direct contact with a pair of electrode elements, one of said electrode elements being integrally bonded and embedded in one of the two major surfaces of the aforesaid membrane and the other of said electrode elements being integrally bonded and embedded in the other major surface of the membrane, said electrode elements comprising palladium metal powder having a surface area of at least ten square meters per gram, means for supplying hydrogen to one of said electrodes and means for supplying oxygen to the other of said electrodes.

References Cited in the file of this patent

UNITED STATES PATENTS

| | | |
|---|---|---|
| 2,229,431 | Young | Jan. 21, 1941 |
| 2,819,492 | Cummin et al. | Jan. 14, 1958 |
| 2,831,045 | Harding | Apr. 15, 1958 |
| 2,861,116 | Grubb | Nov. 18, 1958 |
| 2,913,511 | Grubb | Nov. 17, 1959 |
| 2,914,596 | Gorin et al. | Nov. 24, 1959 |
| 2,933,547 | Grubb | Apr. 19, 1960 |

FOREIGN PATENTS

| | | |
|---|---|---|
| 680,982 | Great Britain | Oct. 15, 1952 |
| 913,911 | Germany | June 21, 1954 |